United States Patent
Ohga et al.

(10) Patent No.: US 6,718,783 B2
(45) Date of Patent: Apr. 13, 2004

(54) VEHICLE AIR CONDITIONER WITH AUTOMATIC AIR-CONDITIONING CONTROL

(75) Inventors: Akira Ohga, Ichinomiya (JP); Takayoshi Kawai, Hoi-gun (JP); Yuichi Kajino, Nagoya (JP); Yoshinori Ichishi, Kariya (JP); Tatsumi Kumada, Gamagori (JP)

(73) Assignee: Denso Corporation, Kariya (JP)

( * ) Notice: Subject to any disclaimer, the term of this patent is extended or adjusted under 35 U.S.C. 154(b) by 12 days.

(21) Appl. No.: 10/375,603

(22) Filed: Feb. 27, 2003

(65) Prior Publication Data

US 2003/0164000 A1 Sep. 4, 2003

(30) Foreign Application Priority Data

Mar. 1, 2002 (JP) .......................... 2002-055562
Dec. 19, 2002 (JP) .......................... 2002-368086

(51) Int. Cl.⁷ ............................................. B60H 1/32
(52) U.S. Cl. ........................... 62/244; 165/42; 165/43; 165/202
(58) Field of Search ...................... 62/244, 239; 236/91, 236/1 B; 165/42, 43, 202, 271

(56) References Cited

U.S. PATENT DOCUMENTS

| | | | | |
|---|---|---|---|---|
| 4,941,525 A | * | 7/1990 | Ito et al. | 165/202 |
| 5,167,365 A | * | 12/1992 | Mitoshi et al. | 236/49.3 |
| 5,839,506 A | * | 11/1998 | Honda et al. | 165/203 |
| 6,037,567 A | * | 3/2000 | Inoue et al. | 219/202 |
| 6,092,376 A | * | 7/2000 | Lake et al. | 62/133 |
| 6,178,760 B1 | * | 1/2001 | Tanaka et al. | 62/154 |
| 6,293,123 B1 | * | 9/2001 | Iritani et al. | 62/409 |
| 6,466,853 B1 | * | 10/2002 | Niimi et al. | 701/65 |

FOREIGN PATENT DOCUMENTS

| JP | 8-197933 | | 8/1996 |
|---|---|---|---|
| JP | 2003146062 A | * | 5/2003 |

* cited by examiner

Primary Examiner—William E. Tapolcai
Assistant Examiner—Mohammad M. Ali
(74) Attorney, Agent, or Firm—Harness, Dickey & Pierce, PLC (57) ABSTRACT

In a vehicle air conditioner with an automatic air-conditioning control, when a change operation of a set temperature is not performed by a passenger while air conditioning control is performed based on the set temperature in one region of environment condition, it is determined that the one region is a region corresponding to a passenger's preference. Accordingly, even if the change operation of the set temperature is not performed, when the region is stored once for the air conditioning control, the region is used as a learned region. Further, when the change operation of the set temperature is performed in an another region, a correction of the set temperature of the learned region is restricted. Thus, it can restrict the set temperature of a region, which is satisfied by the passenger from being changed.

10 Claims, 9 Drawing Sheets

| TAM | | S1 | S2 | S3 | S4 |
|---|---|---|---|---|---|
| | A4 | 25 (NON) | 25 (NON) | 25 (NON) | 25 (NON) |
| | A3 | 25 (NON) | 25 (NON) | 25 (NON) | 25 (NON) |
| | A2 | 25 (NON) | 25 (NON) | 25 (NON) | 25 (NON) |
| | A1 | 25 (NON) | 25 (NON) | 25 (NON) | 25 (NON) |

| TAM | | S1 | S2 | S3 | S4 |
|---|---|---|---|---|---|
| | A4 | 25 (NON) | 25 (NON) | 25 (NON) | 25 (NON) |
| | A3 | 25 (NON) | 25 (LEARNED) ⇐ | 25 (LEARNED) | 25 (NON) |
| | A2 | 25 (NON) | 25 (NON) | 25 (NON) | 25 (NON) |
| | A1 | 25 (NON) | 25 (NON) | 25 (NON) | 25 (NON) |

|  | S1 | S2 | S3 | S4 |
|---|---|---|---|---|
| A4 | 25 (NON) | 25 (NON) | 25 (NON) | 25 (NON) |
| A3 | 25 (NON) | 24 (LEARNED) | 24 (LEARNED) | 25 (NON) |
| A2 | 25 (NON) | 25 (NON) | 25 (LEARNED) | 25 (NON) |
| A1 | 25 (NON) | 25 (NON) | 25 (NON) | 25 (NON) |

TAM ↑ , TS →

FIG. 7

|  | S1 | S2 | S3 | S4 |
|---|---|---|---|---|
| A4 | 25 (NON) | 25 (NON) | 25 (NON) | 25 (NON) |
| A3 | 25 (NON) | 24 (LEARNED) | 24 (LEARNED) | 25 (LEARNED) |
| A2 | 25 (NON) | 25 (NON) | 25 (NON) | 25 (NON) |
| A1 | 25 (NON) | 25 (NON) | 25 (NON) | 25 (NON) |

TAM ↑ , TS →

| TSET TAM=10~30°C | | | | | | |
|---|---|---|---|---|---|---|
| | TS=0 | 80W/m² | 170W/m² | 300W/m² | 640W/m² | 800W/m² |
| TR= −3°C | 17.5 | 17.5 | 17.5 | 17.5 | 17.5 | 17.5 |
| TR=  3°C | 17.5 | 17.5 | 17.5 | 17.5 | 17.5 | 17.5 |
| TR=  9°C | 17.5 | 17.5 | 17.5 | 17.5 | 17.5 | 17.5 |
| TR= 15°C | 17.5 | 17.5 | 17.5 | 17.5 | 17.5 | 17.5 |
| TR= 20°C | 17.5 | 17.5 | 17.5 | 17.5 | 17.5 | 17.5 |
| TR= 23°C | 17.5 | 17.5 | 25   | 17.5 | 17.5 | 17.5 |
| TR= 26°C | 17.5 | 17.5 | 25   | 17.5 | 17.5 | 17.5 |
| TR= 29°C | 17.5 | 17.5 | 17.5 | 17.5 | 17.5 | 17.5 |
| TR= 32°C | 17.5 | 17.5 | 17.5 | 17.5 | 17.5 | 17.5 |
| TR= 36°C | 17.5 | 17.5 | 17.5 | 17.5 | 17.5 | 17.5 |
| TR= 42°C | 17.5 | 17.5 | 17.5 | 17.5 | 17.5 | 17.5 |
| TR= 48°C | 17.5 | 17.5 | 17.5 | 17.5 | 17.5 | 17.5 |
| TR= 55°C | 17.5 | 17.5 | 17.5 | 17.5 | 17.5 | 17.5 |

VEHICLE AIR CONDITIONER WITH AUTOMATIC AIR-CONDITIONING CONTROL

CROSS REFERENCE TO RELATED APPLICATION

This application is based upon Japanese Patent Applications No. 2002-55562 filed on Mar. 1, 2002, and No. 2002-368086 filed on Dec. 19, 2002, the contents of which are incorporated herein by reference.

BACKGROUND OF THE INVENTION

1. Field of the Invention

The present invention relates to a vehicle air conditioner, which has an automatic air-conditioning control function and a learning control function of a passenger's preference for reflecting the passenger's preference to an air-conditioning operation.

2. Related Art

An air conditioner such as the one disclosed in JP-A-8-197933 has a learning control function. The air conditioner memorizes a set temperature in each of regions separated from each other by the detected value of the environmental condition of a vehicle, such as an inside air temperature and an outside air temperature. When the passenger performs a changing operation of the set temperature in an operation region, the set temperature of peripheral regions around the operation region is also corrected. Therefore, the set temperature, which is a preferred temperature of the passenger in the peripheral region, may be changed.

For example, in a case where the passenger satisfy the air conditioning operation in a region at the set temperature of 25° C., when the region is moved to an adjacent region due to a change of the outside air temperature, the passenger may change the set temperature to a set temperature of 24° C. for cooling. In this case, in the conventional air conditioner, the set temperature of this region is corrected to 24° C., and the set temperature of peripheral regions around the region is also corrected. Therefore, a control value of the peripheral region, where the passenger satisfies at the set temperature of 25° C, may be changed to another value. Accordingly, an air conditioning control different from a passenger's preference may be performed after returning to the peripheral region having the changed another value.

If the correction of the set temperature of the peripheral region around the operation region is simply not performed, it is necessary to perform a change operation of the set temperature whenever the region is moved to a non-learned region.

SUMMARY OF THE INVENTION

An object of the present invention is to provide a vehicle air conditioner with an improved air conditioning control.

Another object of the present invention to provide a vehicle air conditioner that learns a set temperature corresponding to a passenger's preference, and performs a comfortable air conditioning control.

According to an aspect of the present invention, a vehicle air conditioner includes a memory unit for memorizing a set temperature of a passenger compartment of the vehicle for each of plural regions that are divided from each other by an environment condition relating to air conditioning operation of the passenger compartment, a temperature setting unit that is manually operated by a passenger for setting the set temperature at a desired value, and a control unit for controlling the air conditioning operation of the passenger compartment. In the vehicle air conditioner, when the temperature setting unit is operated, the control unit corrects the set temperature for learning in an operation region that is a region among the plural regions, corresponding to a value of the environment condition at an operation time of the temperature setting unit. The control unit performs the air conditioning operation based on the set temperature of a present region among the plural regions, corresponding to a value of the present environment condition. Further, when a region, among the plural regions, is used once for performing the air conditioning operation, the control unit determines that the region is a learned region and restricts a correction of the set temperature in the learned region, regardless of a correction of the set temperature due to operation of the temperature setting unit. Accordingly, even when the change operation of the set temperature is not performed while the air conditioning operation is performed based on the set temperature in one region, the set temperature of the one region is determined as a passenger's preference temperature. Thus, once the region is used for performing the air conditioning operation, the region can be stored as a learned region, and a correction of the set temperature in the learned region is restricted when a change operation of the set temperature of another region is performed. As a result, passenger's preference air-conditioning control can be performed when the learned region is used.

In the present invention, the memory unit stores the operation region as a learned region. Further, when the present region is moved from a region before being moved to a region to be moved among the plural regions due to a change of the environment condition, the control unit changes a correction degree of the set temperature in the region to be moved in accordance with whether the region to be moved is the learned region, so that a change of the set temperature, larger than a predetermined value, is restricted. For example, when the region to be moved is the learned region, the control unit prohibits a correction of the set temperature of the region to be moved. On the other hand, when the region to be moved is a non-learned region except for the learned region among the plural regions, the control unit corrects the set temperature of the region to be moved at a value substantially equal to the set temperature of the region before being moved.

Alternatively, a learning state of the learned region is divided into an operation learning state where the set temperature is corrected by the operation of the temperature setting unit, and a using learning state that is substantially used in the air conditioning operation without a correction of the set temperature due to the operation of the temperature setting unit. In this case, when the region to be moved is in the operation learning state, the control unit prohibits a correction of the set temperature of the region to be moved. On the other hand, when the region to be moved is in the using learning state, the control unit corrects the set temperature of the region to be moved to a value between the set temperature of the region before being moved and the set temperature of the region to be moved. Further, when the region to be moved is a non-learned region except for the learned region among the plural regions, the control unit corrects the set temperature of the region to be moved to a value substantially equal to the set temperature of the region before being moved.

In the present invention, when the temperature setting unit is operated, the control unit corrects the set temperature of peripheral regions of the operation region among the plural regions, and the control unit changes a correction degree of the set temperature of the peripheral regions in accordance with whether the peripheral region is the learned region. Accordingly, air conditioning control corresponding to the passenger's preference can be performed.

Preferably, when the peripheral region is the learned region, the control unit prohibit a correction of the set temperature of the peripheral region. On the other hand, when the peripheral region is a non-learned region except for the learned region in the plural regions, the control unit corrects the set temperature of the peripheral region at a value substantially equal to the set temperature of the operation region.

Alternatively, a learning state of the learned region is divided into an operation learning state where the set temperature is corrected by the operation of the temperature setting unit, and a using learning state that is substantially used in the air conditioning operation without a correction of the set temperature due to the operation of the temperature setting unit. In this case, when the peripheral region is in the operation learning state, the control unit prohibits a correction of the set temperature of the peripheral region. On the other hand, when the peripheral region is in the using learning state, the control unit corrects the set temperature of the peripheral region to a value between the set temperature of the operation region and the set temperature of the peripheral region. Further, when the peripheral region is a non-learned region except for the learned region among the plural regions, the control unit corrects the set temperature of the peripheral region to a value substantially equal to the set temperature of the operation region.

According to another aspect of the present invention, in a vehicle air conditioner, when a control unit determines the same environment condition as an operation environment condition at an operation time of an operation unit, and determines a peripheral environment condition similar to the operation environment condition while determining that the peripheral environment condition is not experienced by the passenger, information of an air-conditioning set state of the operation unit is reflected to the air conditioning operation. Here, the peripheral environment condition, which is determined to be not experienced by the passenger, is an environment condition where an experienced time of the passenger is shorter than a predetermined time. That is, a comfortable air conditioning control is determined based on whether the air conditioning operation is performed at least for the predetermined time on the same environment condition. Accordingly, a time period and operation number, until an air conditioning control near to the passenger's preference is performed from every condition, can be reduced.

According to a further another aspect of the present invention, in a vehicle air conditioner, when the environment condition changes to a non-experience environment condition that is not experienced yet by the passenger, the control unit maintains at the present air-conditioning set state. On the other hand, when the environment condition changes to an experience environment condition that has experienced by the passenger, the control unit re-sets the previously stored air-conditioning set state. Here, the experience environment condition, which is determined to be not experienced by the passenger, is an environment condition where an experienced time of the passenger is shorter than a predetermined time. Accordingly, abnormal operation of the learning control can be prevented.

According to a further another aspect of the present invention, a program of a computer for an air conditioner for performing air conditioning operation of the passenger compartment of the vehicle, includes a memory process, a reflecting process, and a restricting process. The memory process memorizes information of an air-conditioning set state after being operated, corresponding to an operation environment condition at an operation time, when a change operation of the air-conditioning set state is performed by a passenger. The reflecting process reflects the change operation of the air-conditioning set state to the air conditioning operation, in the same environment condition as the operation environment condition, and in a peripheral environment condition similar to the operation environment condition, where an experienced time of the passenger is shorter than a predetermined time. Further, the restricting process restricts a reflecting degree or prevent a reflection of the change operation of the air-conditioning set state to the air conditioning operation, in a peripheral environment condition similar to the operation environment condition, where the experienced time of the passenger is equal to or longer than the predetermined time. Accordingly, air conditioning control near the passenger's preference can be readily performed while operation time and operation number of the passenger's operation can be reduced.

On the other hand, the program of the computer for performing the air conditioning control can include the memory process, a maintaining process and a re-setting process. In this case, the maintaining process maintains the present air conditioning state when the present environment condition changes to an environment condition where an experience time of the passenger is shorter than a predetermined time. Further, the re-setting process resets the previously stored air-conditioning set state, when the present environment condition changes to an environment condition where the experienced time of the passenger is equal to or longer than the predetermined time. Accordingly, an abnormal operation of the learning control can be prevented, and the comfortable air conditioning operation can be performed.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Specific embodiments of the present invention will be described hereinafter with reference to the accompanying drawings in which the same or similar component parts are designated by the same or similar reference numerals.

(First Embodiment)

The first embodiment of the present invention will be now described with reference to FIGS. 1–7. First, a schematic ventilation system in which air is blown toward a passenger compartment of a vehicle will be described with reference to FIG. 1. An air conditioning unit 10 has an inside/outside air switching box 11 in which an outside air inlet 11a for introducing outside air (i.e., air of the outside of the vehicle) and an inside air inlet 11b for introducing inside air (i.e., air of the passenger compartment). The inside/outside air switching box 11 is provided at the most upstream end of the air conditioning unit 10.

Figure 1:
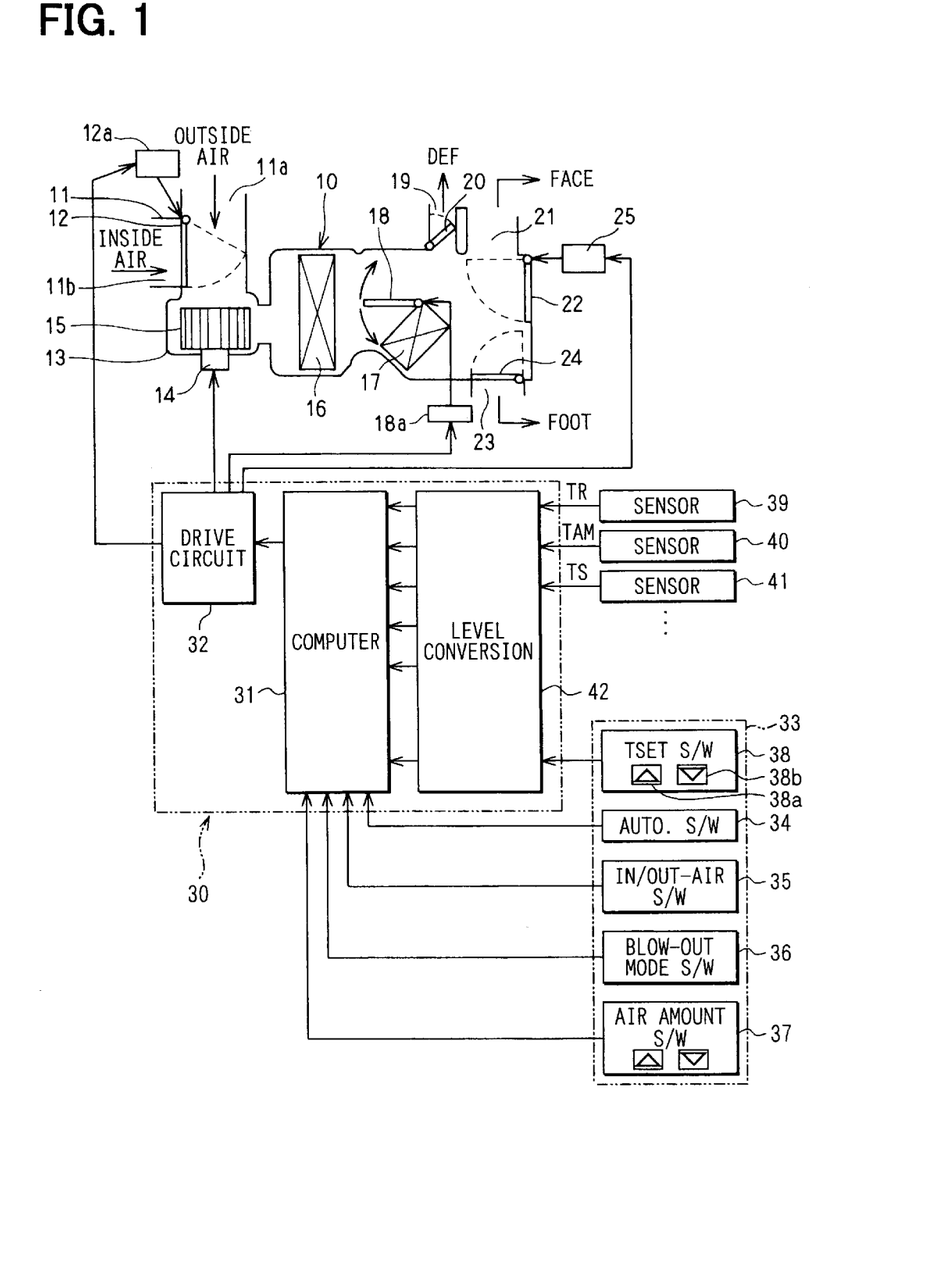
FIG. 1 is a schematic diagram illustrating a vehicle air conditioner with a control system according to a first embodiment of the present invention.

The inside/outside air switching box 11 has an inside/outside switching door 12 that is rotatably disposed therein between the outside air inlet 11a and the inside air inlet 11b. The inside/outside switching door 12 is driven by an actuator 12a such as a servomotor. The switching door 12 opens and closes the outside air inlet 11a and the inside air inlet 11b to adjust an air mixing ratio between inside air and outside air. For example, when the switching door 12 opens the outside air inlet 11a and closes the inside air inlet 11b, only outside air is introduced from the outside air inlet 11a. When the switching door 12 opens the inside air inlet 11b and closes the outside air inlet 11a, only inside air is introduced from the inside air inlet 11b. When the switching door 12 opens both the outside air inlet 11a and the inside air inlet 11b, a mixing ratio between an outside air amount and an inside air amount is adjusted by adjusting the operation position of the switching door 12.

An air blower unit 13 is provided at a downstream side of the inside/outside air switching box 11 in the air conditioning unit 10, for blowing air downstream in the air conditioning unit 10. The air blower unit 13 has a blower-driving motor 14 (actuator) and a centrifugal blower fan 15 connected to a rotor shaft of the blower-driving motor 14. An evaporator 16 and a heater core 17 are arranged downstream from the blower fan 15.

The evaporator 16 is a cooling heat exchanger and constitutes a refrigeration cycle with a compressor driven by an engine (not shown) and the like. Refrigerant is evaporated in the evaporator 16 by absorbing heat from air passing through the evaporator 16, so that air from the evaporator 16 in the air conditioning unit 10 is cooled. The heater core 17 is a heating heat exchanger, for heating the air using hot water (engine-cooling water) flowing from the engine 20 as a heat source.

An air mix door 18 is rotatably provided at an upstream side of the heater core 17. The air mix door 18 is driven by an actuator 18a. An opening degree of the air mix door 18 is adjusted by the actuator 18a, so that a ratio between an amount of air passing through the heater core 17 and an amount of air bypassing the heater core 17 is adjusted, thereby adjusting the temperature of the air blown into the passenger compartment. Namely, the air passing through the heater core 17 and the air bypassing the heater core 17 are mixed with each other so that conditioned air having a desired temperature can be obtained. Therefore, the air mix door 18 constitutes a temperature adjusting means for the air blown into the passenger compartment.

At the most downstream side of the ventilation passage in the air conditioning unit 10, a blow-out mode switching portion is provided. More specifically, a defroster door 20 for opening and closing a defroster blow-out port 19, a face door 22 for opening and closing a face blow-out port 21 and a foot door 24 for opening and closing a foot blow-out port 23 are provided. These doors 20, 22, 24 are driven by an actuator 25 to determine a blow-out mode, for example, a face mode (FACE), a bi-level mode (B/L), a foot mode (FOOT), a foot/defroster mode (FOOT/DEF) or a defroster mode (DEF). The conditioned air is blown into the passenger compartment from an opened port according to the blow-out mode.

When the face mode is selected as the blow-out mode, the face blow-out port 21 is fully opened while the defroster blow-out port 19 and the foot blow-out port 23 are closed, thereby blowing out the conditioned air only through the face blow-out port 21 toward the upper body of a passenger in the passenger compartment of the vehicle.

When the bi-level mode is selected as the blow-out mode, the face blow-out port 21 and the foot blow-out port 23 are opened while the defroster blow-out port 19 is closed, thereby blowing out the conditioned air through the face blow-out port 21 and the foot blow-out port 23 toward the upper body and the foot portion of the passenger in the passenger compartment of the vehicle at the substantially equal amount of the conditioned air.

When the foot mode is selected as the blow-out mode, the foot blow-out port 23 is fully opened while the face blow-out port 21 is closed, and the defroster blow-out port 19 is slightly opened. As a result, the conditioned air is mainly blown toward the foot portion of the passenger through the foot blow-out port 19 while some of the conditioned air is blown toward an inside surface of a windshield of the vehicle.

When the defroster mode is selected as the blow-out mode, the defroster blow-out port 19 is fully opened while the face blow-out port 21 and the foot blow-out port 23 are closed, thereby blowing out the conditioned air only through the defroster blow-out port 19 toward the inside surface of the windshield of the vehicle.

When the foot/defroster mode is selected as the blow-out mode, the defroster blow-out port 19 and the foot blow-out port 23 are opened while the face blow-out port 21 is closed, thereby blowing out the conditioned air through the defroster blow-out port 19 and the foot blow-out mode at the substantially same amount of the conditioned air.

An air conditioning control device 30 has a microcomputer 31 with a control means and a memory means. The amount of air blown into the passenger compartment is controlled by determining the revolution speed of the blower motor 14, which is determined by the applied voltage (blower voltage) thereto. The blower voltage is adjusted in accordance with an output signal from the microcomputer through a drive circuit 32. Other actuators 12a, 18a and 25 are also controlled by the drive circuit 32 based on output signals from the microcomputer 31.

The microcomputer 31 has a well-known structure including a CPU, a ROM portion, a RAM portion, a standby RAM portion, an I/O port portion, an A/D converter and the like.

The standby RAM serves as the memory means. That is, the standby RAM has a backup memory for storing values (information) with the learned passenger's preferences even when an ignition switch (hereinafter, referred to as an IG) is turned off. The electrical voltage is supplied to the standby RAM directly from a battery equipped in the vehicle, not through the IG, even if the IG is turned off. Besides, a backup battery (not shown) is equipped with the vehicle to supply electrical voltage to the microcomputer 31 for a short time in a situation where the microcomputer 31 is disconnected from the battery.

Operational signals are input to the microcomputer 31 from an air conditioning operational portion 33 arranged on an instrument panel in the passenger compartment. On the air conditioning operational portion 33, there are provided with many kinds of switches such as an AUTO switch 34 for setting an automatic control condition of the air conditioner, an inside/outside air selecting switch 35 for manually selecting an inlet mode between an inside air inlet mode and an outside air inlet mode, a blow-out mode selecting switch 36 for manually selecting the blow-out mode described above, a blowing air amount adjusting switch 37 for manually adjusting the amount of air blown by the fan 15, a temperature setting switch 38 for setting a preferred temperature (set temperature) of the passenger.

The temperature setting switch 38 includes a temperature setting-up switch 38a for increasing a set temperature of the passenger compartment, and a temperature setting-down switch 38 for decreasing the set temperature of the passenger compartment. When the temperature setting-up switch 38a is pushed by every one time, the set temperature is increased by 0.5° C. On the other hand, when the temperature setting-down switch 38b is pushed by every one time, the set temperature is decreased by 0.5° C. The temperature setting switch 38 serves as a temperature setting unit, that is operated by the passenger for setting a passenger's desired condition (i.e., set temperature) in the air conditioning of the vehicle.

The microcomputer 31 receives sensor signals from several sensors each of which detects an environmental condition that influences the air conditioning operation in the passenger compartment. More specifically, the sensors include an inside air temperature sensor 39 for detecting the temperature (TR) of the inside air in the passenger compartment, an outside air temperature sensor 40 for detecting the temperature (TAM) of the outside air of the vehicle, a sunlight sensor 41 for detecting the amount of sunlight (TS) incident into the passenger compartment, an evaporator temperature sensor (not shown) for detecting the temperature (TE) of the evaporator (e.g., the temperature of the air immediately after passing through the evaporator), a water temperature sensor (not shown) for detecting the temperature (TW) of the cooling water circulating in the engine and the heater core 17 and the like. The signals from those sensors are input to the microcomputer 31 after being converted by a level converter circuit 42. A signal sent from the temperature setting switch 38 is also input to the microcomputer 31 after its level is converted by the level converter circuit 42.

Figure 2:
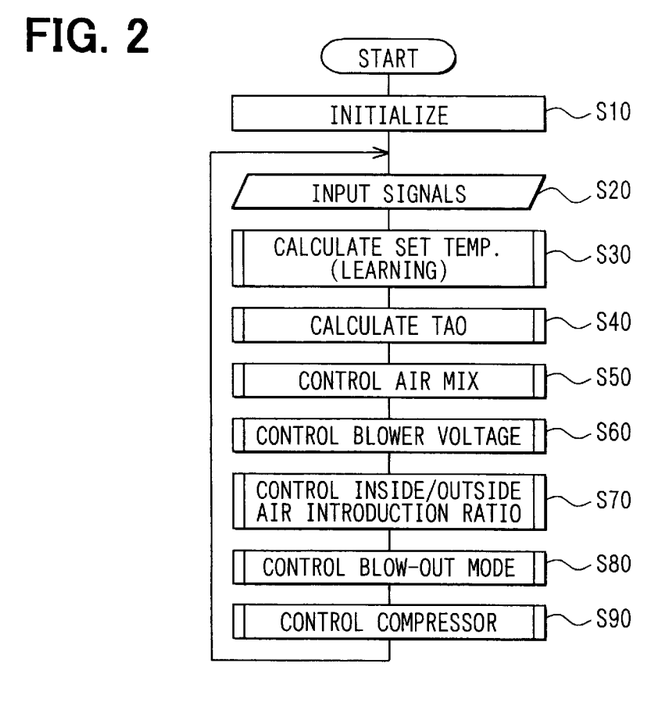
FIG. 2 is a flow diagram showing an automatic air conditioning control of the first embodiment of the present invention.

Next, a flow diagram executed by the microcomputer 31 in this embodiment will be described with reference to FIG. 2. This flow diagram will start by turning on the IG switch. First, every conversion and setting of initial values of flags or the like are executed at step S10. Next, at step S20, the microcomputer 31 reads the operational signals from the switches 34–38, and reads the detected signals indicative of the environmental conditions of the vehicle from the sensors 39–41.

At step S30, a set temperature (TSET) is calculated and learned based on the environmental condition signals input at step S20, the signal from the temperature setting switch 38, and a set temperature map stored in the standby RAM. The detail control of the step S30 will be described later.

Next, a target blowing temperature TAO of air blown into the passenger compartment is calculated at step S40 using the following equation (1), based on detected signals relative to the environmental conditions that are read out at the step S20, and the set temperature calculated (learned) at step S30. The TAO is a necessary air temperature for maintaining the passenger compartment at the set temperature TSET, regardless of a change in the environmental condition (heat load condition).

$$TAO = KSET \times TSET - KR \times TR - KAM \times TAM - KS \times TS + C \qquad (1)$$

Wherein KSET, KR, KAM and KS represent coefficients, and C represents a correction constant. TSET, TR, TAM, TS represent the calculated set temperature, the inside air temperature, the outside air temperature, the sunlight amount as described above, respectively.

Next, at step S50, a target opening degree SW of the air mix door 18 is calculated according to the following equation (2) based on the TAO described above, so that the temperature of air blown into the passenger compartment through the outlet ports 13, 21, 23 is adjusted. In the equation (2), TE is the temperature of air after passing through the evaporator 16, and TW is the temperature of the hot water flowing into the heater core 17, which are read out at the step S20.

$$SW = ((TAO-TE)/(TW-TE)) \times 100(\%) \qquad (2)$$

Next, at step S60, a blower voltage for determining the air amount blown into the passenger compartment is calculated, and voltage applied to the blower motor 14 is adjusted to become to the calculated blower voltage. Therefore, a flow amount of air blown into the passenger compartment can be controlled.

At step S70, an introduction ratio between inside air and outside air is calculated, and the actuator 12a of the inside/outside air switching door 12 is controlled so that the calculated introduction ratio can be obtained.

Next, at step S80, the blow-out mode is determined. Then, the microcomputer 31 controls the actuator 25 so that the doors 20, 22 and 24 are operated predetermined positions corresponding to the calculated blow-out mode. Then, the control of the compressor is performed at step S90, and thereafter, the control program returns to step S20 in FIG. 2. The control in the flow diagram of FIG. 2 is repeated.

Figure 3:
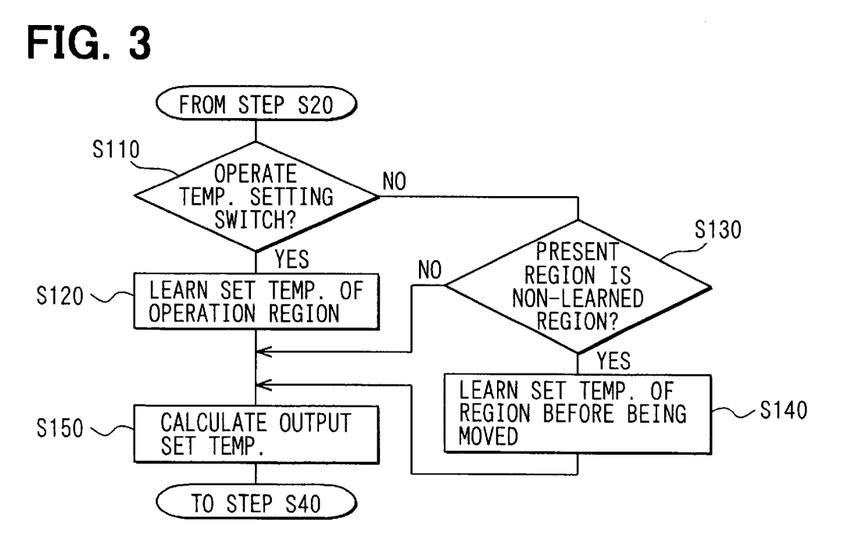
FIG. 3 is a flow diagram showing a main feature of the automatic air conditioning control of the first embodiment of the present invention.
Figure 4:
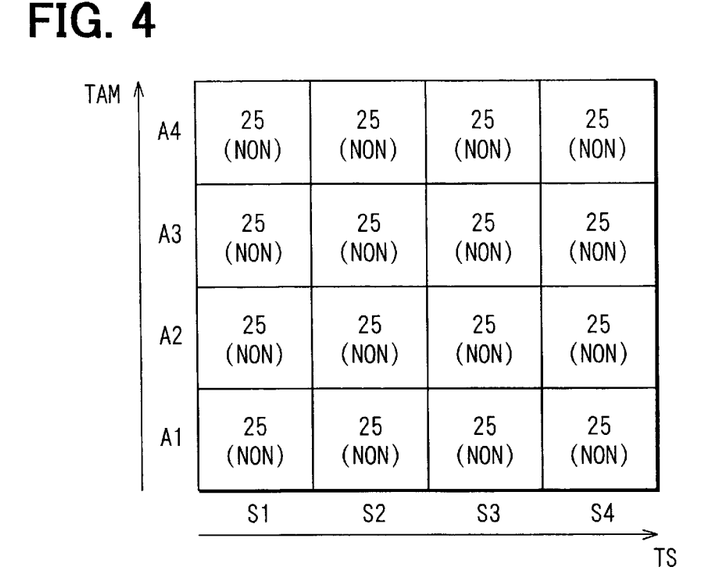
FIG. 4 is a diagram showing an initial state of set temperature of plural regions that are divided from each other by an outside air temperature TAM and a sunlight amount TS, according to the first embodiment of the present invention.

Next, the learning of the set temperature will be described in detail, with reference to FIG. 3. First, at step S110, it is determined whether or not a passenger operates the temperature setting switch 38. This is, at step S110, it is determined whether or not a change operation of the set temperature is performed by the passenger using the temperature setting switch 38. When it is determined that the change operation of the set temperature is performed at step S110, the value of the set temperature in a set temperature map that is stored in the standby RAM are corrected. As shown in FIG. 4, in the set temperature map, a set temperature is stored for each of plural regions that are divided by the environment condition such as the sunlight amount (TS) and the outside air temperature (TAM). Each region has its own control set temperature, which is initially set at a central value of the control set temperature, for example, 25° C. When the passenger manually operates the temperature setting switch 38 to set his/her preferred temperature in the passenger compartment, the microcomputer learns the preferred temperature by correcting the set temperature memorized in a region determined by the inside air temperature, the outside temperature and the sunlight amount. FIG. 4 shows samples of the set temperatures of the regions.

At step S120, when the temperature setting-up switch 38a is operated (pushed) by one time, an added value that is obtained by adding a predetermined temperature (e.g., 0.5° C.) to the previously-output set temperature is learned as a set temperature of a region corresponding to the present environment condition (hereafter, referred to as present region). On the other hand, when the temperature setting-down switch 38b is operated (pushed) by one time, a subtracted value that is obtained by subtracting a predetermined temperature (e.g., 0.5° C.) from the previously-output set temperature (i.e., set temperature) is learned as a set temperature of the present region.

When it is determined that the temperature setting switch 38 is not operated by the passenger at step S110, it is determined whether or not the present region is a non-learned region. When the region to be moved is not learned yet, the previously output set temperature of the region before being moved is learned as a set temperature of the present region at step S140. That is, when the present region is moved from the region before being moved by a change of the environment condition without the change operation of the set temperature, it is determined whether or not the present region is the learned region at step S130. When the present region is the non-learned region, the set temperature of the present region is corrected by the previously output set temperature of the region before being moved at step S140. On the other hand, when it is determined that the present region is the non-learned region that is not learned yet at step S130, the previously learned set temperature is preferentially used, and re-learning is not performed. Next, at step S150, an output set temperature corresponding to the present environment condition is calculated in accordance with a set temperature map. After performing step S150 in FIG. 3, the control program moves to step S40 in FIG. 2.

Next, the learning of the set temperature will be now described with reference to FIGS. 3–7. FIGS. 4–7 show set temperature maps stored in the standby RAM. The set temperature of each of the regions that are separated from each other by the sunlight amount TS and the outside air temperature TAM in FIGS. 4–7 is stored. In FIGS. 4–7, "25" indicates a set temperature of 25° C., "NON" indicates that the region is not learned yet, and "LEARNED" indicates that the region has learned. FIG. 4 shows an initial state of the set temperature map. In FIG. 4, the initial value of the set temperature, for example, 25° C. is stored in all regions.

Figure 5:
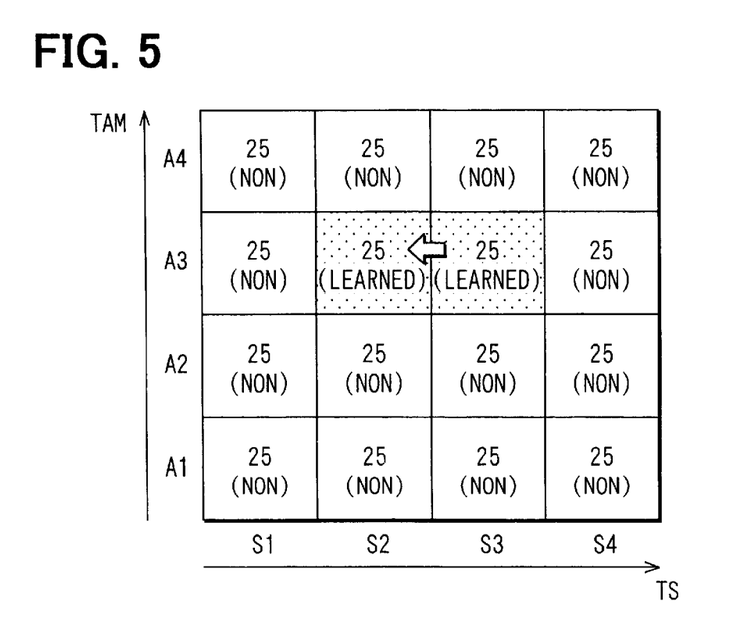
FIG. 5 is a diagram for explaining a learning of a set temperature according to the first embodiment of the present invention.

FIG. 5 shows a state where the present region is changed from the initial state of FIG. 4, without performing the change operation of the set temperature. In FIG. 5, when the present sunlight amount TS is S3 and the present outside air temperature TAM is A3, the present region is (S3, A3). Because the change operation of the set temperature is not performed after the start of the air conditioning operation from the initial value, it is determined that the region of (S3, A3) is not learned at step S130 in FIG. 3, and the set temperature of the region (S3, A3) is learned by 25° C. at step S140.

When the air conditioning control is performed based on the set temperature of the region (S3, A3), if the set temperature is not changed, it is determined that the set temperature of this region (S3, A3) is a passenger's preference temperature. Accordingly, in this case, even when the change operation of the set temperature is not performed, only when air conditioning control is performed once in the region (S3, A3), it is determined that the region (S3, A3) is a learned region.

When the sunlight amount Ts is changed and the present region is changed from the region (S3, A3) to the region (S2, A3) as shown in FIG. 5, the set temperature of the region (S3, A3) before being moved is learned as the set temperature of the region (S2, A3) after being moved. That is, the previously output set temperature of 25° C. of the region (S3, A3) is learned as the set temperature of the region (S2, A3).

Figure 6:
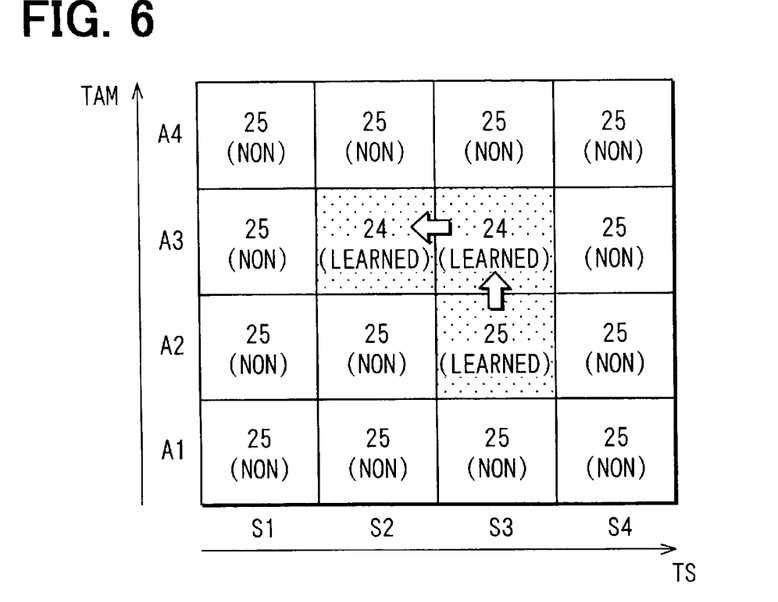
FIG. 6 is a diagram for explaining a learning of a set temperature according to the first embodiment of the present invention.

Next, a case, where the region to be moved is the learned region when the region changes with a change of the environment condition, will be now described with reference to FIG. 6. In FIG. 6, it is supposed that only the region (S3, A3) has learned at 24° C., the other regions are maintained at the initial values, and the present region starts from the region (S3, A2). In this case, because the region (S3, A2) is not learned, the control program of FIG. 3 moves from step S130 to step S140, and the set temperature of the region (S3, A2) is learned by 25° C. When the outside air temperature TAM changes, and the region is changed to (S3, A3), it is determined that the region (S3, A3) is the learned region at step S130 in FIG. 3 because the region (S3, A3) was learned. Further, when the sunlight amount TS changes, and the region is changed from the region (S3, A3) to the region (S2, A3), the control program in FIG. 3 moves to step S140 because the region (S2, A3) after being moved is not learned yet. In this case, the set temperature of the region (S3, A3) before being moved is learned as the set temperature of the region (S2, A3) after being moved.

Figure 7:
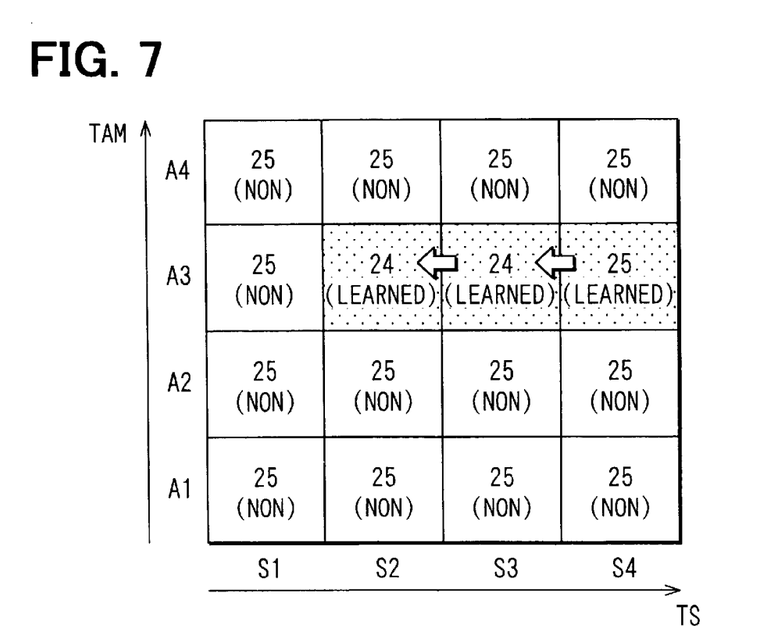
FIG. 7 is a diagram for explaining a learning of a set temperature according to the first embodiment of the present invention.

Next, a case where the change operation of the set temperature is performed will be now described with reference to FIG. 7. Here, it is assumed that the present region is the region (S4, A3), and all the regions start from the initial values. First, because the region (S4, A3) is not used, the region (S4, A3) is learned by 25° C. Next, when the sunlight amount TS changes, and the present region is changed from the region (S4, A3) to the region (S3, A3), it is determined that the region (S3, A3) is not learned yet at step S130 in FIG. 3, and the region (S3, A3) is learned by 25° C. Then, when the set temperature changes to 24° C. in the region (S3, A3), the region (S3, A3) is re-learned by 24° C. Further, when the sunlight amount TS changes and the region moves to (S2, A3), because the region is not learned, the control program in FIG. 3 moves from step S130 to step S140. In this case, the set temperature of the region (S2, A3) to be moved is learned by the set temperature 24° C. of the region (S3, A3) before being moved.

According to the first embodiment of the present invention, when the region within the set temperature map is changed in accordance with a change of the environment condition relating to the air conditioning operation, when the region to be moved is the learned region to which a passenger's preference was reflected, a correction of the set temperature of the region to be moved is prohibited. That is, because the region to be moved is not used already, the learned result of the region to be moved is not changed, so that it is possible for each region to learn the passenger's preference corresponding to the environment condition.

Further, in a case where air conditioning control is performed based on a set temperature of one region, when the change operation of the set temperature is not performed, it is determined that the set temperature of the one region corresponds to the passenger's preference. Accordingly, even when the change operation of the set temperature is not performed, the one region that is used once for the air conditioning control is set as the learned region. Therefore, the learned result of the one region is not changed, and it is possible for each region to learn the passenger's preference corresponding to the environment condition.

Further, in a case where the present region changes from the learned region to a non-learned region in accordance with a change of the environment condition, the set temperature of the region to be moved is corrected and learned as the set temperature of the region before being moved. That is, even when the change operation of the set temperature is not changed every when the present region moves to the non-learned region, the control reflecting the passenger's preference can be performed by the learning.

(Second Embodiment)

The second embodiment of the present invention will be now described with reference to FIGS. 8 and 9.

In the above-described first embodiment, when the change operation of the set temperature is performed, only the region (operation region) corresponding to the environment condition at the operation time is learned. However, in the second embodiment, the peripheral regions around the operation region is also set as the learning object region. In this case, the learned region(s) among the peripheral regions is not learned.

Figure 8:
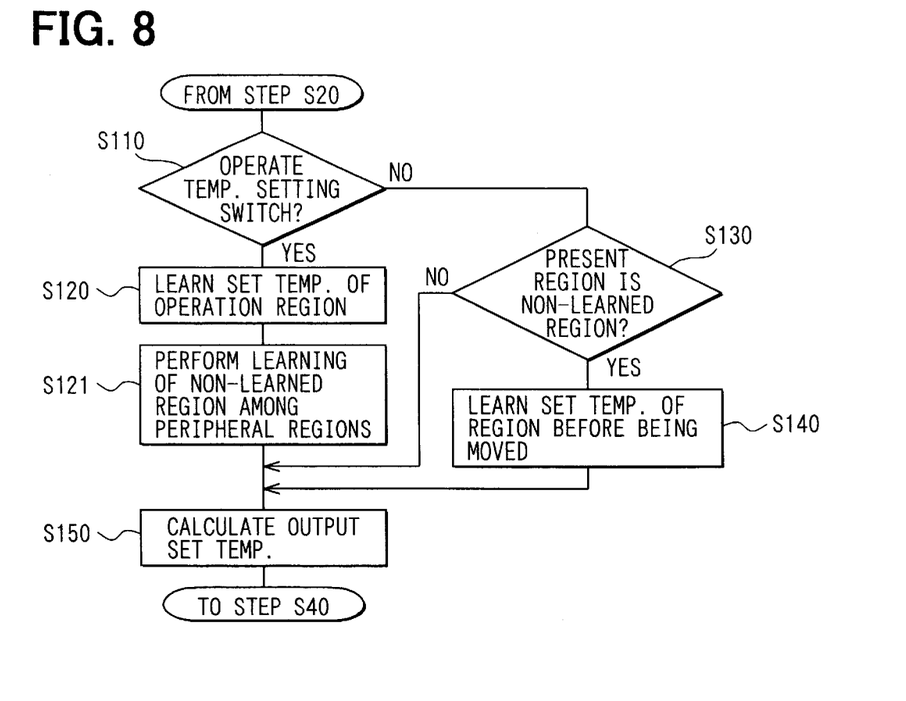
FIG. 8 is a flow diagram showing a main feature of an automatic air conditioning control in a vehicle air conditioner according to a second embodiment of the present invention.
Figure 9:
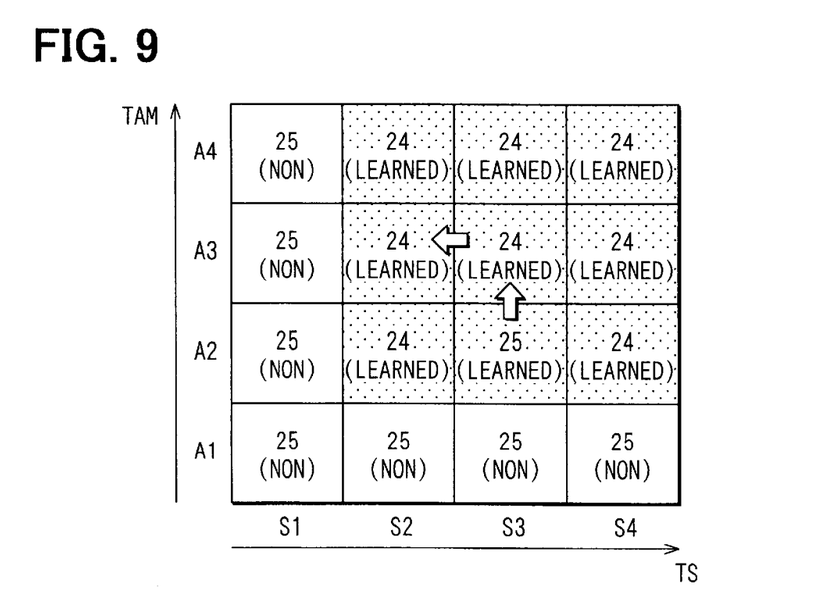
FIG. 9 is a diagram for explaining a learning of a set temperature according to the second embodiment of the present invention.

Accordingly, in the second embodiment, the control flow diagram is set as shown in FIG. 8. In FIG. 8, step S121 is added after step S120, as compared with FIG. 3 of the above-described first embodiment. The other parts of FIG. 8 is similar to that of FIG. 3 of the first embodiment.

As shown in FIG. 8, when the change operation of the set temperature is performed, the control program moves from step S110 to step S120, and only the operation region is learned at step S120, similarly to the first embodiment. Next, at step S121, only non-learned region is learned among the peripheral regions of the operation region by the set temperature of the operation region.

The learning method of only the non-learned region among the peripheral regions will be now described with reference to FIGS. 8 and 9. FIG. 9 shows a set temperature map stored in the standby RAM. In FIG. 9, it is assumed that the present region is (S3, A2) within the set temperature map, and all the regions start from the initial values. First, because the region (S3, A2) is non-learned region, the region (S3, A2) is learned by 25° C. Next, when the present region changes from the region (S3, A2) to the region (S3, A3) with a change of the outside air temperature TAM, because the region (S3, A3) is non-learned region, the control program of FIG. 8 moves from step S130 to step S140, and the region (S3, A3) is also learned by the set temperature 25° C of the region before being moved.

Then, when the change operation of the set temperature is performed so that the set temperature is changed from 25° C. to 24° C. in the region (S3, A3) that is the operation region, the operation region (S3, A3) is re-learned by 24° C at step S120. Next, at step S121, only the non-learned regions among the eight peripheral regions of the operation region (S3, A3) are learned by the same temperature of 24° C. as the operation region (S3, A3). Specifically, among the eight peripheral regions of the operation region (S3, A3), the region (S3, A2) is already used and learned. Therefore, the set temperature of the region (S3, A2) is not changed. Here, the learning object region is the eight regions at step S121. However, the learning object region can be changed to be wider.

In the second embodiment, among the peripheral regions of the operation region, in the region that is used once for the air conditioning control and is satisfied in the air conditioning control, the learned value is preferentially used and is not re-learned (corrected). That is, the control value of the satisfied region is not changed. Therefore, the already learned result of the peripheral regions is not changed by operation of the other region, and it is possible for each region to learn in accordance with preference of the environment condition. In the second embodiment, the other parts are similar to those of the above-described first embodiment, and explanation thereof is omitted.

(Third Embodiment)

The third embodiment of the present invention will be now described with reference to FIGS. 10 and 11. In the above-described second embodiment of the present invention, the already learned region among the peripheral regions of the operation region is not learned. However, in the third embodiment, the already learned region among the peripheral regions of the operation region is divided into a first learned state (operation learned state) where the change operation of the set temperature was performed, and a second learned state (using learned state) which is used once for the air conditioning control without performing the change operation of the set temperature. In this case, the already learned region among the peripheral regions of the operation region is learned only in the second learned state, but is not learned in the first learned state.

Figure 10:
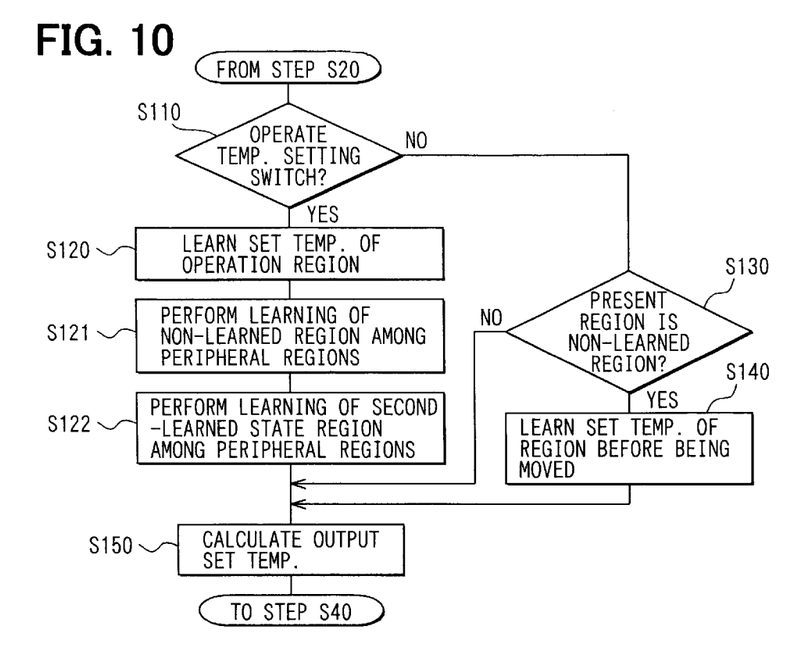
FIG. 10 is a flow diagram showing a main feature of an automatic air conditioning control in a vehicle air conditioner according to a third embodiment of the present invention.
Figure 11:
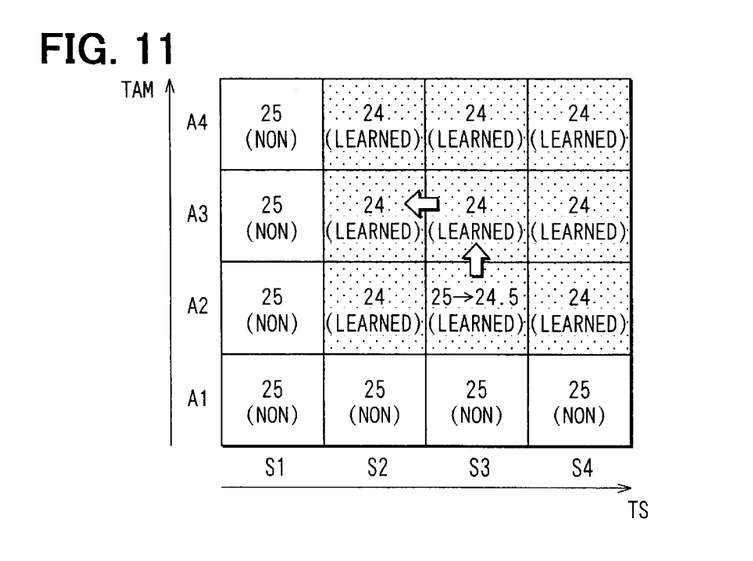
FIG. 11 is a diagram for explaining a learning of a set temperature, according to the third embodiment of the present invention.

Accordingly, in the third embodiment, the control program is changed as shown in FIG. 10. That is, step S122 is added as compared with FIG. 8 of the second embodiment, and the other parts are similar to corresponding steps in FIGS. 3 and 8.

As shown in FIG. 10, in the third embodiment, when the change operation of the set temperature is performed, the operation region is learned at step S120. Next, at step S121, the non-learned region is learned among the peripheral regions of the operation region. Next, at step S122, among the already learned region, the region at the second learned state (second-learned state region) that is used once in the air conditioning control is also learned.

Next, this learning method will be now described with reference to FIGS. 10 and 11. FIG. 11 shows a set temperature map stored in the standby RAM. In FIG. 11, it is assumed that the present region is (S3, A2) within the set temperature map, and all the regions start from the initial values. First, because the region (S3, A2) is the non-learned region, the region (S3, A2) is learned by 25° C. Next, when the present region changes from the region (S3, A2) to the region (S3, A3) with a change of the outside air temperature TAM, because the region (S3, A3) is non-learned region, the control program of FIG. 10 moves from step S130 to step S140, and the region (S3, A3) is also learned by the set temperature 25° C. of the region before being moved.

Then, when the change operation of the set temperature is performed in the region (S3, A3) so that the set temperature is changed to 24° C. in the region (S3, A3) that is the operation region, the operation region (S3, A3) is re-learned by 24° C. at step S120. Next, at step S121, only the non-learned regions among the eight peripheral regions of the operation region (S3, A3) are learned by the same temperature of 24° C. as the operation region (S3, A3). Among the eight peripheral regions of the operation region (S3, A3), the region (S3, A2) is already learned, and therefore, the set temperature of the region (S3, A2) is not changed at step S121. The region (S3, A2) is the second-learned state region where the change operation of the set temperature is not performed. Therefore, in the third embodiment, at step S122, the mean value between the already learned temperature 25° C. and the operated temperature of 24° C. is re-learned as the set temperature of the region (S3, A2).

In the third embodiment, a learning value of the set temperature at step S121 and at step S122 can be determined in accordance with the equation (3).

$$LT(P)=TSET(O)\times a+TSET(P)\times(1-a) \qquad (3)$$

Wherein, LT(P) is the learning value of the set temperature of the peripheral region, TSET(O) is the set temperature of the operation region, TSET(P) is the set temperature of the peripheral region, and "a" is in a range between zero and 1 (i.e., $0 \leq a \leq 1$).

Among the peripheral regions of the operation region, in the region at the first learned state where the change operation of the set temperature is performed, a=0. That is, in this case, the already learned result is used, and the re-learning is not performed. Among the peripheral regions of the operation region, in the region at the second learned state that is used only in the air conditioning control, the "a" is set to be larger than zero and smaller than 1. For example, a=0.5. On the other hand, in the non-learned region among the peripheral regions of the operation region, a=1. In this case, the set temperature of the operation region is used as the learned value of the non-learned region.

In the third embodiment, the other parts are similar to those of the above-described first embodiment, and the detail explanation thereof is omitted.

(Fourth Embodiment)

In the above-described first embodiment of the present invention, in a case where the air conditioning control is performed based on the set temperature of a region, when the change operation of the set temperature is not performed, it is determined that the set temperature of the region corresponds to the passenger's preference. Further, when a region is used once in the air conditioning control even when the change operation of the set temperature is not performed in the region, it is determined that the region has learned. In the fourth embodiment, when a region is used under the same environment condition for a time longer than a predetermined time while the change operation of the set temperature is not performed, it is determined that the region is the learned region.

Figure 12:
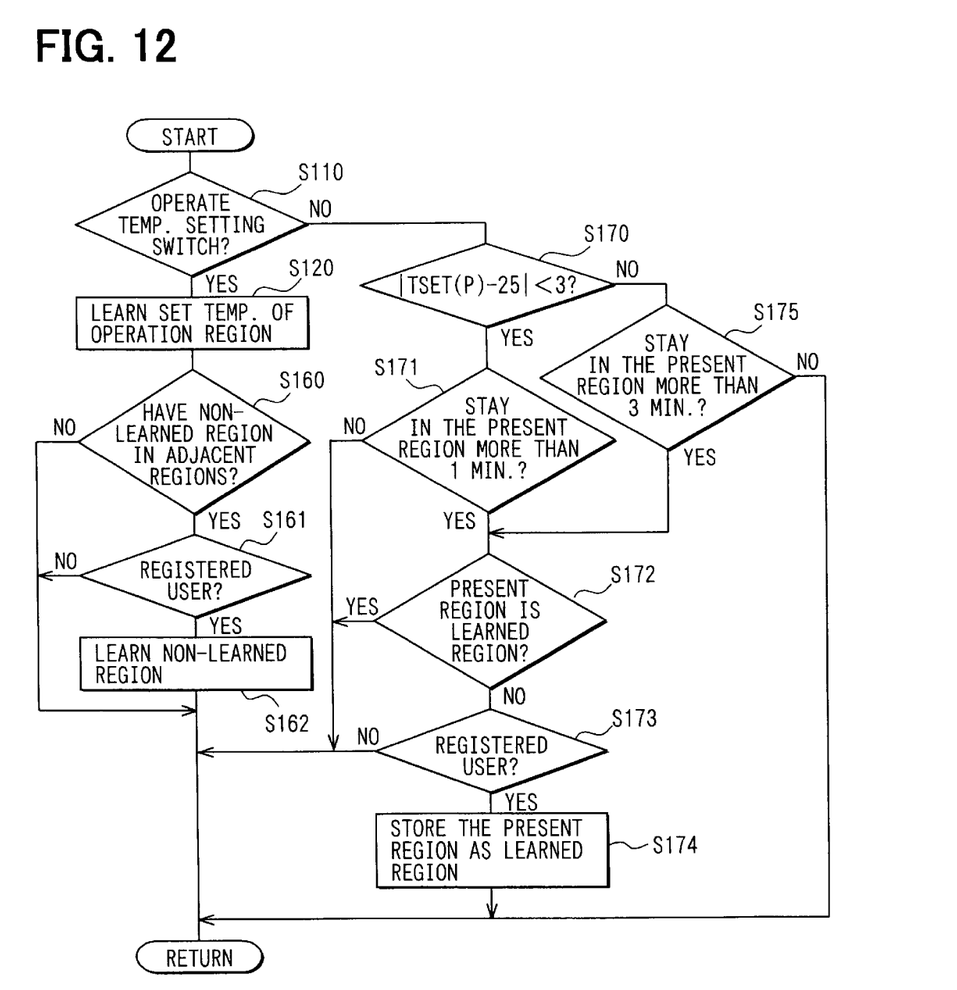
FIG. 12 is a flow diagram showing a main feature of an automatic air conditioning control in a vehicle air conditioner according to a fourth embodiment of the present invention.
Figure 13:
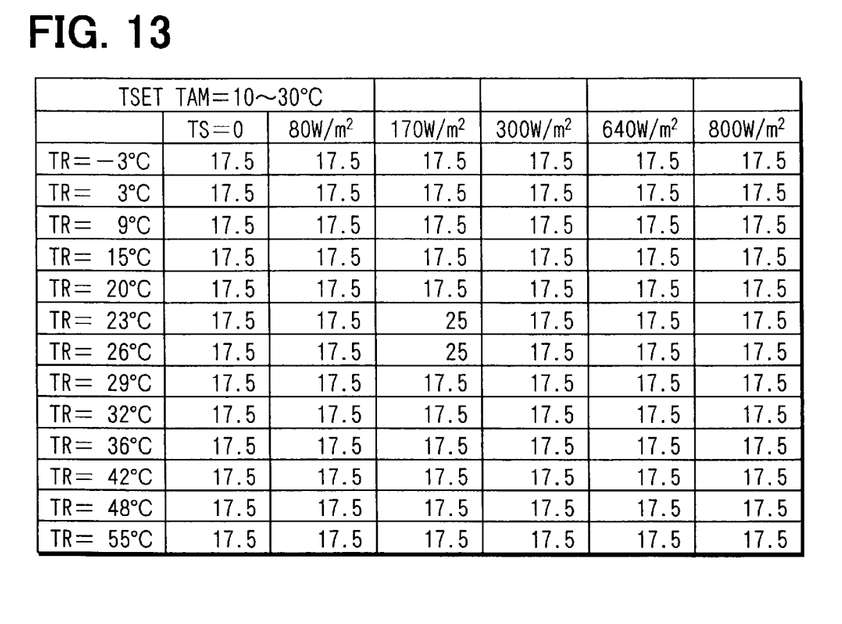
FIG. 13 is a set temperature map, for explaining a learning of the set temperature, according to the fourth embodiment of the present invention.

In the fourth embodiment, the learning of the set temperature is controlled as shown in FIG. 12. FIG. 13 shows an example of set temperature maps stored in the standby RAM. The set temperature map of FIG. 13 is prepared for each range of the outside air temperature TAM, and the set temperature TSET is stored for each of regions that are divided from each other by the inside air temperature TR and the sunlight amount TS. Further, 17.5° C. is set as the initial value of the set temperature TSET for each region. Therefore, in FIG. 13, the regions where the set temperature TSET is 17.5° C. are the non-learned regions, and the regions where the set temperature is different from 17.5° C. are the learned region.

As shown in FIG. 12, first, when the change operation of the set temperature is performed, the control program moves from step S110 to step S120. As step S120, the operated set temperature is learned in the operation region of the corresponding environment condition with the present TR and the present sunlight amount TS in the set temperature map for the present outside air temperature TAM. Further, the operation region is stored as the learned region at step S120.

Next, at step S160, it is determined whether or not there is a region except for the learned region in adjacent regions (i.e., peripheral region) adjacent to the operation region. That is, at step S160, it is determined whether or not there is a non-learned region in the adjacent regions of the operation region. When the adjacent regions have the non-learned region at step S160, it is determined whether or not the driver is a registered vehicle user (registered driver) by a communication between a cell phone of the driver and the vehicle at step S161.

When the driver is the registered vehicle user, the non-learned region among the adjacent regions of the operation region is learned by the set temperature of the operation region, and is stored as the learned region. When the driver is different from the registered vehicle user, the determination at step S161 is NO, and the learning of the set temperature at step S162 is not performed. Therefore, it can effectively prevent abnormal air conditioning control from being performed by a driver different from the registered user (registered driver).

On the other hand, when the change operation of the set temperature is not performed at step S110, the control program moved from step S110 to step S170. At step S170, it is determined whether or not the absolute value of a difference between the previously set temperature TSET (P) and a general set temperature (e.g., 25° C.) is smaller than a predetermined temperature (e.g., 3° C.). When the determination at step S170 is YES, it is determined whether or not the control stays in the present region for a time period equal to or more than a first predetermined time (e.g., 1 minute) on the same environment condition.

When the control stays in the present region in the time period equal to or more than 1 minute at step S171, it is determined whether or not the present region is the learned region at step S172. When the determination at step S172 is NO, that is, when the present region is the non-learned region, the control program moves to step S173. Next, at step S173, it is determined whether or not the driver is a registered vehicle user (registered driver) by a communication between the cell phone of the driver and the vehicle at step S173. When the driver is the registered vehicle user, the present region is stored as the learned region at step S174.

On the other hand, when the absolute value of the different between the set temperature of the present region and the general temperature (e.g., 25° C.) is equal to or larger than the predetermined value (e.g., 3° C.) at step S170, the control program moves from step S170 to step S175. Next, at step S175, it is determined whether or not the control stays in the present region in a time period equal to or longer than a second predetermined time (e.g., 3 minutes). Generally, the second predetermined time is set longer than the first predetermined time. When the air conditioning control stays in the present region in the time period equal to or longer than 3 minutes, the control program moves from step S175 to step S172, and the control program from step S172 is performed.

When the absolute value of the temperature difference between the present set temperature and the general set temperature is equal to or larger than the predetermined temperature, the learning is performed in the case where the time staying in the present region is sufficiently longer. Therefore, the learning is not performed in an abnormal state such as in a case where the driver enters the passenger compartment after running.

Generally, in order to determine whether or not a passenger is comfortable in the region, it is determined whether or not the control is performed in the region under the same environment condition in a time period more than a predetermined time. In the fourth embodiment, when the determination at step S171, S175 is NO, that is, when the change operation of the set temperature is performed in a time period shorter than a predetermined time on the same environment condition, the present region is not learned and is determined as a non-experience (non-learned). Therefore, when the change operation of the set temperature is performed in a region around the non-experience region, the non-experience region is learned by the set temperature of the operation region, and is stored as the learned region.

Accordingly, in the fourth embodiment, the air-conditioning set state, where the passenger is felt to be pleasant, can be re-set, and the tendency of the passenger's preference can be reflected to the periphery of the environment condition where the passenger operates. Thus, a time and an operation number of the passenger, until the air conditioning operation near to the passenger's preference is performed from every condition, can be reduced.

In the fourth embodiment, an air-conditioning setting switch such as the temperature setting switch 38 can be provided on both the instrument panel in the passenger compartment and the steering of the vehicle. In this case, when the change operation is reflected for learning, a reflecting degree is made larger in a case where the air-conditioning setting switch of the steering is operated, as compared with a case where the air-conditioning setting switch of the instrument panel is operated. Therefore, it can further restrict an abnormal operation from being learned due to a switching operation of a front-passenger next to a driver's seat. In the fourth embodiment, the other parts are similar to those of the above-described first embodiment.

(Fifth Embodiment)

Figure 14:
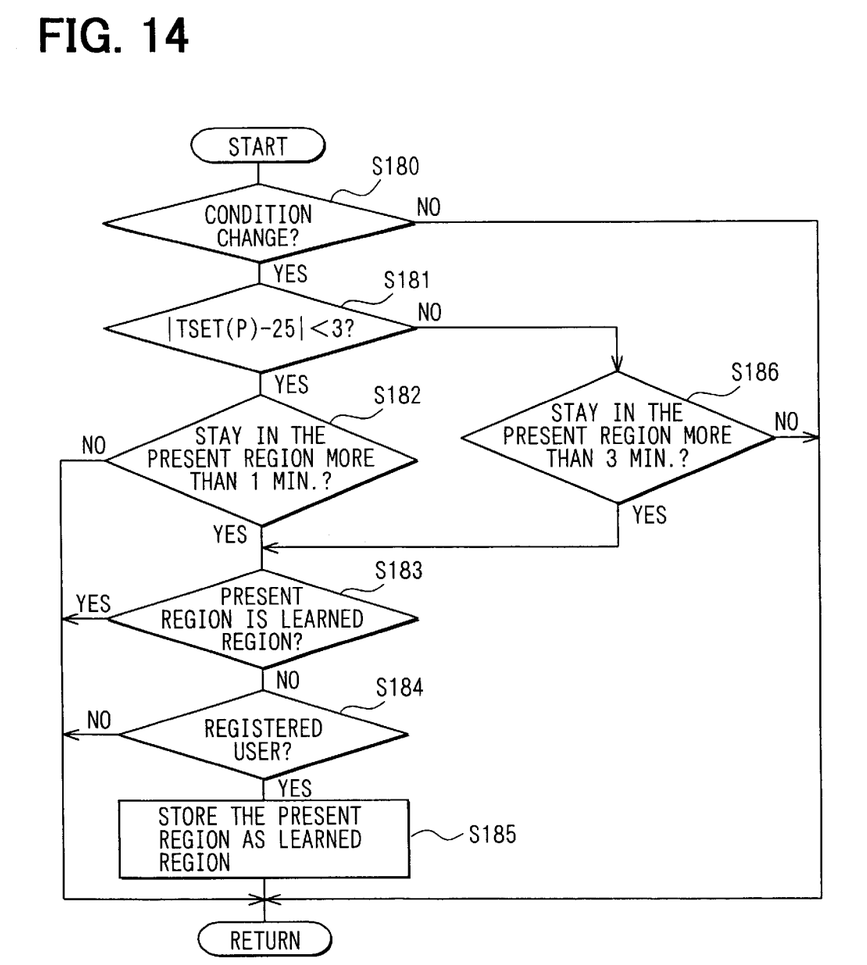
FIG. 14 is a flow diagram showing a main feature of an automatic air conditioning control in a vehicle air conditioner according to a fifth embodiment of the present invention.

In the fifth embodiment, if the environment condition is changed, when a region after being changed with the environment condition is used without a change operation such as the set temperature change at least for a predetermined time, the region is set as the learned region. The control is shown in FIG. 14. In the fifth embodiment, the set temperature map is similar to that of the above-described fourth embodiment.

As shown in FIG. 14, first, it is determined whether or not the present region, having the present inside air temperature TR and the present sunlight amount TS in a set temperature map using the present outside air temperature TAM, is changed to the other region with a change of the environment condition. When the environment condition is changed and the region is moved to an another region, it is determined whether or not the absolute value of a difference between the present set temperature TSET (P) and the general set temperature (e.g., 25° C.) is smaller than a predetermined temperature (e.g., 3° C.) at step S181. When the determination at step S181 is YES, it is determined whether or not the control stays in the changed present region (the another region) in a time period equal to or more than a first predetermined time (e.g., 1 minute) at step S182.

When the control stays in the present region in the time period equal to or more than 1 minute at step S182, it is determined whether or not the present region is the learned region at step S183. When the determination at step S183 is NO, that is, when the present region is the non-learned region, the control program moves to step S184. Next, at step S184, it is determined whether or not the driver is a registered vehicle user (registered driver) by a communication between the cell phone of the driver and the vehicle. When the driver is the registered vehicle user, the present region is stored as the learned region at step S185.

On the other hand, when the absolute value of the different between the set temperature of the present region and the general temperature (e.g., 25° C.) is equal to or larger than the predetermined value (e.g., 3° C.) at step S181, the control program moves from step S181 to step S186. Next, at step S186, it is determined whether or not the control stays in the present region in a time period equal to or longer than a second predetermined time (e.g., 3 minutes). Generally, the second predetermined time is set longer than the first predetermined time. When the control stays in the present region in the time period equal to or longer than 3 minutes, the control program moves from step S186 to step S183, and the control program from step S183 is performed.

Generally, in order to determine whether or not a passenger is comfortable in the region, it is determined whether or not the control is performed in the region under the same environment condition in a time period more than the predetermined period. In the fifth embodiment, when the determination at step S181, S186 is NO, that is, when the change operation of the set temperature is performed in a time period shorter than a predetermined time period in the changed environment condition, the present region is not learned and is determined as a non-experience (non-learned). Accordingly, in the fifth embodiment, the air-conditioning set state, where the passenger is felt to be pleasant, can be re-set. On the other hand, in the non-experience region, the present setting state, in which there is a strong possibility of a pleasant air conditioning, can be maintained. Therefore, it can prevent the pleasant air conditioning from being deteriorated by an abnormal operation of the learning control.

(Sixth Embodiment)

Figure 15:
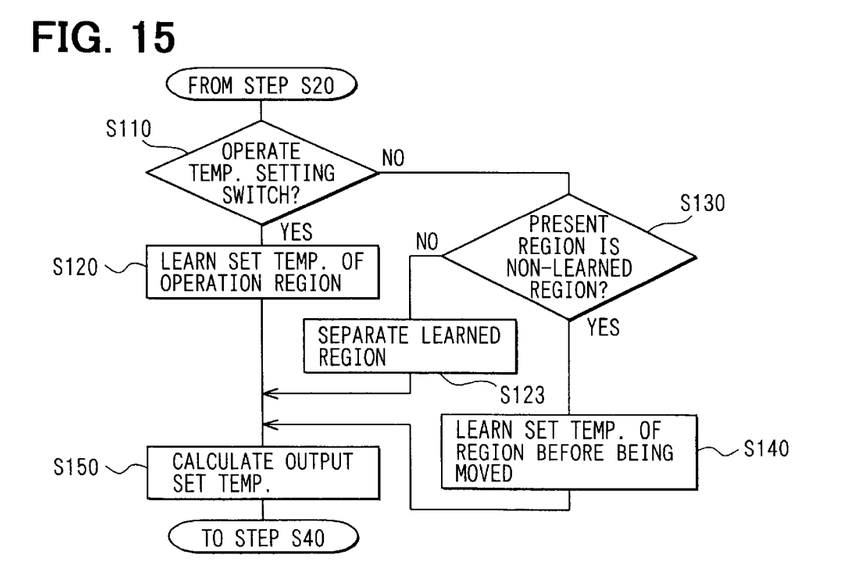
FIG. 15 is a flow diagram showing a main feature of an automatic air conditioning control in a vehicle air conditioner according to a sixth embodiment of the present invention.

The sixth embodiment of the present invention will be now described with reference to FIG. 15. In the above-described first embodiment, when the region to be moved is a learned region, the learned region is not re-learned. However, in the sixth embodiment, the learned region is separated into a first learned state (operation learned state) where the change operation of the set temperature is performed, and a second learned state (using learned state) where only air conditioning control is performed without a change operation of the set temperature. Specifically, in FIG. 15, step S123 is added as compared with FIG. 3 of the first embodiment. Further, similarly to the above-described third embodiment, the learned region can be re-learned in accordance with the learned state.

In the sixth embodiment, a learning value of the set temperature at step S123 and at step S140 can be determined in accordance with the equation (4).

$$LT(A)=TSET(B) \times b+TSET(A) \times (1-b) \qquad (4)$$

Wherein, LT(A) is the learned value of the set temperature in the region (present region) after being moved, TSET(B) is the set temperature of the region (previously using region) before moving, TSET(A) is the set temperature of the region (present region) after being moved, and "b" is in a range between zero and 1 (i.e., $0 \leq b \leq 1$).

When the region is moved to the present region with the first leaned state by a change of the environment condition, b=0. In this case, the previously learned result of the present region is preferentially used, and a re-learning is not performed.

On the other hand, when the region is moved to the region having the second learned state that is used only in the air conditioning control, the "b" is set to be larger than zero and smaller than 1. For example, b=0.5. On the other hand, when the present region is the non-learned region, b=1. In this case, at step S140, the set temperature of the region (previously using region) before moving is used as the learned value of the present region, and re-learning is performed.

In the sixth embodiment, the other parts are similar to those of the above-described first embodiment.

(Seventh Embodiment)

The seventh embodiment is a modification of the above-described second embodiment. In the above-described second embodiment, at step S121, the non-learned region among the peripheral regions of the operation region is learned by the same value as the operation region. However, in the seventh embodiment, a learning value of the set temperature in the non-learned region among the peripheral regions can be set at a calculation temperature that is calculated based on the initial value and the set temperature of the operation region. For example, the calculation temperature is the mean value between the initial value and the set temperature of the operation region.

The learning value of the set temperature in the non-learned region among the peripheral regions can be calculated in accordance with the equation (5).

$$LT(P)=TSET(O) \times (1-c)+TSET(I) \times c \qquad (5)$$

Wherein, LT(P) is the learning value of the set temperature of the peripheral region, TSET(O) is the set temperature of the operation region, TSET(I) is the initial value of the peripheral region, and "c" is larger than zero and is smaller than 1 (i.e., 0<c<1).

Accordingly, in the seventh embodiment, even when the peripheral region of the operation region is the non-learned region, the learning value can be suitably selected, and comfortable air conditioning can be provided.

In the seventh embodiment, the other parts are similar to those of the above-described second embodiment.

Although the present invention has been fully described in connection with the preferred embodiments thereof with reference to the accompanying drawings, it is to be noted that various changes and modifications will become apparent to those skilled in the art.

For example, in the above-described first through seventh embodiments of the present invention, when the change operation of the set temperature is performed, the operation region is learned by the set temperature that is newly operated. However, a learning value of the operation region can be calculated based on the newly-operated set temperature and previously-operated set temperature(s). For example, the learning value of the operation region can be set by the mean value of the newly-operated set temperature and the previously-operated set temperature(s).

In the above-described first through third embodiments of the present invention, the set temperature is stored for each of the regions that are divided from each other by the sunlight amount and the outside air temperature. However, the set temperature can be stored for each of the regions that are divided from each other by the inside air temperature.

In the above-described embodiments of the present invention, the set temperature is typically used as an air-conditioning set state. However, as the air-conditioning set state, the other operation such as the air blowing amount and an air-blowing mode can be used.

Such changes and modifications are to be understood as being within the scope of the present invention as defined by the appended claim.

What is claimed is:

1. An air conditioner for a vehicle, comprising:

a memory unit for memorizing a set temperature of a passenger compartment of the vehicle, for each of plural regions that are divided from each other by an environment condition relating to air conditioning operation of the passenger compartment;

a temperature setting unit that is manually operated by a passenger, for setting the set temperature at a desired value; and a control unit for controlling the air conditioning operation of the passenger compartment, wherein:

when the temperature setting unit is operated, the control unit corrects the set temperature for learning in an operation region that is a region among the plural regions, corresponding to a value of the environment condition at an operation time of the temperature setting unit;

the control unit performs the air conditioning operation based on the set temperature of a present region among the plural regions, corresponding to a value of the present environment condition; and when a region, among the plural regions, is used once for performing the air conditioning operation, the control unit determines that the region is a learned region and restricts a correction of the set temperature in the learned region, regardless of a correction of the set temperature due to operation of the temperature setting unit.

2. The air conditioner according to claim 1, wherein:

the memory unit stores the operation region as a learned region; and when the present region is moved from a region before being moved to a region to be moved among the plural regions, due to a change of the environment condition, the control unit changes a correction degree of the set temperature in the region to be moved in accordance with whether the region to be moved is the learned region, so that a change of the set temperature, larger than a predetermined value, is restricted.

3. The air conditioner according to claim 2, wherein:

when the region to be moved is the learned region, the control unit prohibits a correction of the set temperature of the region to be moved; and when the region to be moved is a non-learned region except for the learned region among the plural regions, the control unit corrects the set temperature of the region to be moved at a value substantially equal to the set temperature of the region before being moved.

4. The air conditioner according to claim 2, wherein:

a learning state of the learned region is divided into an operation learning state where the set temperature is corrected by the operation of the temperature setting unit, and a using learning state that is substantially used in the air conditioning operation without a correction of the set temperature due to the operation of the temperature setting unit;

when the region to be moved is in the operation learning state, the control unit prohibits a correction of the set temperature of the region to be moved;

when the region to be moved is in the using learning state, the control unit corrects the set temperature of the region to be moved to a value between the set temperature of the region before being moved and the set temperature of the region to be moved; and when the region to be moved is a non-learned region except for the learned region among the plural regions, the control unit corrects the set temperature of the region to be moved to a value substantially equal to the set temperature of the region before being moved.

5. The air conditioner according to claim 1, wherein:

when the temperature setting unit is operated, the control unit corrects the set temperature of peripheral regions of the operation region among the plural regions; and the control unit changes a correction degree of the set temperature of the peripheral regions in accordance with whether the peripheral region is the learned region.

6. The air conditioner according to claim 5, wherein:

when the peripheral region is the learned region, the control unit prohibit a correction of the set temperature of the peripheral region; and when the peripheral region is a non-learned region except for the learned region in the plural regions, the control unit corrects the set temperature of the peripheral region at a value substantially equal to the set temperature of the operation region.

7. The air conditioner according to claim 5, wherein:

a learning state of the learned region is divided into an operation learning state where the set temperature is corrected by the operation of the temperature setting unit, and a using learning state that is substantially used in the air conditioning operation without a correction of the set temperature due to the operation of the temperature setting unit;

when the peripheral region is in the operation learning state, the control unit prohibits a correction of the set temperature of the peripheral region;

when the peripheral region is in the using learning state, the control unit corrects the set temperature of the peripheral region to a value between the set temperature of the operation region and the set temperature of the peripheral region; and when the peripheral region is a non-learned region except for the learned region among the plural regions, the control unit corrects the set temperature of the peripheral region to a value substantially equal to the set temperature of the operation region.

8. An air conditioner for a vehicle, comprising:

a memory unit for memorizing a set temperature of a passenger compartment of the vehicle, for each of plural regions that are divided from each other by an environment condition relating to air conditioning operation of the passenger compartment;

a temperature setting unit that is manually operated by a passenger, for setting the set temperature at a desired value; and a control unit for controlling the air conditioning operation of the passenger compartment, wherein:
  when the temperature setting unit is operated, the control unit corrects the set temperature of an operation region that is a region among the plural regions, corresponding to a value of the environment condition at an operation time of the temperature setting unit, and the operation region is stored as a learned region;
  the control unit performs the air conditioning operation based on the set temperature of a present region among the plural regions, corresponding to a value of the present environment condition; and
  when the present region is moved from a region before being moved to a region to be moved among the plural regions, due to a change of the environment condition, the control unit changes a correction degree of the set temperature in the region to be moved in accordance with whether the region to be moved is the learned region, so that a change of the set temperature, larger than a predetermined value, is restricted.

9. The air conditioner according to claim 8, wherein:

when the region to be moved is the learned region, the control unit prohibits a correction of the set temperature of the region to be moved; and when the region to be moved is a non-learned region except for the learned region among the plural regions, the control unit corrects the set temperature of the region to be moved at a value substantially equal to the set temperature of the region before being moved.

10. The air conditioner according to claim 8, wherein:

a learning state of the learned region is divided into an operation learning state where the set temperature is corrected by the operation of the temperature setting unit, and a using learning state that is substantially used in the air conditioning operation without a correction of the set temperature due to the operation of the temperature setting unit;

when the region to be moved is in the operation learning state, the control unit prohibits a correction of the set temperature of the region to be moved;

when the region to be moved is in the using learning state, the control unit corrects the set temperature of the region to be moved to a value between the set temperature of the region before being moved and the set temperature of the region to be moved; and when the region to be moved is a non-learned region except for the learned region among the plural regions, the control unit corrects the set temperature of the region to be moved to a value substantially equal to the set temperature of the region before being moved.

* * * * *